(12) United States Patent
Benfield et al.

(10) Patent No.: US 7,657,620 B2
(45) Date of Patent: Feb. 2, 2010

(54) DYNAMIC INTELLIGENT DISCOVERY APPLIED TO TOPOGRAPHIC NETWORKS

(75) Inventors: Jason Benfield, Austin, TX (US); Oliver Yehung Hsu, Austin, TX (US); Lorin Evan Ullmann, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/553,187

(22) Filed: Oct. 26, 2006

(65) Prior Publication Data
US 2008/0159169 A1  Jul. 3, 2008

Related U.S. Application Data

(62) Division of application No. 09/935,397, filed on Aug. 23, 2001, now Pat. No. 7,139,823.

(51) Int. Cl.
*G06F 15/173* (2006.01)
(52) U.S. Cl. ........................... 709/223; 709/224
(58) Field of Classification Search ................ 709/223, 709/224, 225, 226, 227, 228
See application file for complete search history.

(56) References Cited

U.S. PATENT DOCUMENTS

| | | | |
|---|---|---|---|
| 5,485,578 A | 1/1996 | Sweazey | |
| 5,572,640 A * | 11/1996 | Schettler | 345/440 |
| 5,734,642 A | 3/1998 | Vaishnavi et al. | |
| 5,737,319 A | 4/1998 | Croslin et al. | |
| 5,835,720 A | 11/1998 | Nelson et al. | |
| 6,018,567 A | 1/2000 | Dulman | |
| 6,411,997 B1 | 6/2002 | Dawes et al. | |
| 6,664,978 B1 | 12/2003 | Kekic et al. | |
| 6,829,641 B2 | 12/2004 | Schenkel et al. | |
| 6,877,066 B2 * | 4/2005 | Benfield et al. | 711/118 |
| 6,920,506 B2 * | 7/2005 | Barnard et al. | 709/245 |
| 7,003,559 B1 * | 2/2006 | Nataraian et al. | 709/223 |
| 7,050,404 B1 * | 5/2006 | Devlin | 370/254 |
| 7,139,823 B2 * | 11/2006 | Benfield et al. | 709/224 |
| 7,249,173 B2 * | 7/2007 | Nicolson | 709/223 |
| 7,292,541 B1 * | 11/2007 | C S | 370/254 |
| 7,310,666 B2 * | 12/2007 | Benfield et al. | 709/223 |
| 7,318,108 B2 * | 1/2008 | Sreekantiah et al. | 709/242 |

(Continued)

FOREIGN PATENT DOCUMENTS

EP  0964334 A2  12/1999

*Primary Examiner*—Lashonda T Jacobs
(74) *Attorney, Agent, or Firm*—Yee & Associates, P.C.; Jeffrey S. LaBaw

(57) ABSTRACT

A method, system, and computer program product for discovering status of a network topology. A network management framework provides the ability to specify a method for determining how to gather status of a data processing system. A data gathering technique (DGT) may be dynamically adjusted to discovery or monitoring of devices within the data processing system. Different data gathering techniques may be employed in an effort to discover or monitor the devices. In addition, results of previous network data gathering may be stored for later use. These stored results may used to develop an order of relative capabilities for a managed device or devices as compared to other device or devices in the same network. Discovery and monitoring information may be obtained about one device or N devices within the network.

21 Claims, 10 Drawing Sheets

U.S. PATENT DOCUMENTS 7,440,408 B1 * 10/2008 Anderson .................... 370/252
7,516,457 B2 * 4/2009 Eilam et al. ................. 718/104
7,562,132 B2 * 7/2009 Benfield et al. ............. 709/223

* cited by examiner

DYNAMIC INTELLIGENT DISCOVERY APPLIED TO TOPOGRAPHIC NETWORKS

This application is a divisional of application Ser. No. 09/935,397, filed Aug. 23, 2001 now U.S. Pat. No. 7,139,823, which is herein incorporated by reference.

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

Distributed data processing systems with thousands of nodes are known in the prior art. The nodes can be geographically dispersed, and the overall computing environment can be managed in a distributed manner. The managed environment can be logically separated into a series of loosely connected managed regions, each with its management server for managing local resources. The management servers can coordinate activities across the enterprise and can permit remote site management and operation. Local resources within one region can be exported for the use of other regions.

However, currently network status gathering relies on discovery commands such as a "ping" or a SNMP. Such a procedure is inefficient on systems where the "ping" is invalid or in networks where most systems are SNMP compliant (where no "ping" is necessary). At present there is no mechanism for allowing administrators to choose a method for determining how to gather a status of the network. At present, administrators cannot choose to perform SNMP commands first, "ping" commands first, SNMP commands only, or allow for dynamic solutions to be generated. Furthermore, dynamic solutions cannot be created by keeping track of how many machines are SNMP compliant and how many "ping" commands fail, being able to reverse the order of gathering the status of the network, or excluding one command or the other.

Therefore, it would be advantageous to provide a method and system that dynamically gathers status of a network based on specified status gathering parameters so as to eliminate impact on system performance that is caused by invalid or unnecessary network monitoring operations.

SUMMARY OF THE INVENTION

The present invention provides a method, system, and computer program product for discovering status of a network topology. A network management framework provides the ability to specify a method for determining how to gather status of a data processing system. A data gathering technique (DGT) may be dynamically adjusted to discovery or monitoring of devices within the data processing system. Different data gathering techniques may be employed in an effort to discover or monitor the devices. In addition, results of previous network data gathering may be stored for later use. These stored results may be used to develop an order of relative capabilities for a managed device or devices as compared to other device or devices in the same network. Discovery and monitoring information may be obtained about one device or N devices within the network.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

Figure 1:
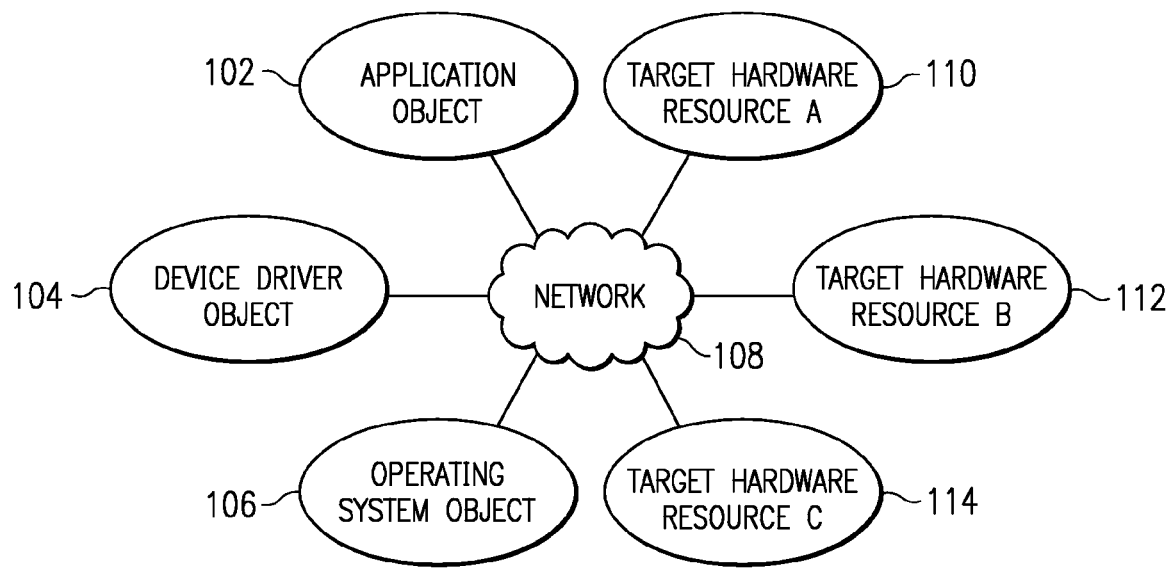
FIG. 1 is a diagram depicting a known logical configuration of software and hardware resources.

The present invention provides a methodology for managing a network. Discovery and monitoring information may be obtained about one device or N devices within the network. The present invention provides a mechanism by which alternative data gathering methods for discovery and monitoring may be used in different circumstances as configured by, for example, a user or system administrator or programmatically determined based on a best method to a user at runtime.

The present invention dynamically adjusts a data gathering technique (DGT) for discovery or monitoring of devices within the data processing system based on, for example, network characteristics, a device's relative abilities to other devices in the data processing system, abilities to support different data gathering techniques, and the like. The network characteristics may be based on link speeds or other devices in the data processing system. A link speed is speed of which data is sent between two endpoints. A device's relative abilities to other devices in the network may be based on ordering capabilities using a speed of the device or the number of devices in the network, which may yield information about each device and physical characteristics of each device.

The ability to support different data gathering techniques may be performed by a Simple Network Management Protocol (SNMP), an Internet Protocol Packet Internet Groper (IP ping), a point-to-point protocol over ethernet (PPPoE), dynamic host configuration protocol (DHCP) or any other client which broadcast to a server requesting an IP address. SNMP is a monitoring and control protocol in which data is passed from SNMP agents, which are hardware and/or software processes reporting activity for each device connected to the network. This activity is reported to a management interface which oversees the network.

SNMP agents return information contained in a Management Information Base (MIB), which may be a data structure that defines what information is obtainable from the device and how the device may be controlled. IP ping is an Internet utility that may be used to determine whether a particular IP address is online. IP ping is used to test and debug a network by sending out a packet and waiting for a response.

In addition, results of previous network data gathering may be stored for later use. These results may used to develop an order of relative capabilities for the managed device or devices as compared to other device or devices in the same network. These results may also be used to supply a number of a device in which the DGT is capable of supplying information about. A multiple device DGT, such as a SNMP address resolution protocol (ARP) table, queries and yields information about a group of devices. Furthermore, ordering data may be provided to discovery scanning engines as well as monitoring engines for use in determining which DGT to use as first, second, and so on.

Discovery scanning engines scan the network and create a representation of the network. Depending upon the state of discovery in a network or the number of devices yet to be polled in the network, the DGT may be altered. After determining a physical topology of the network, if the number of devices in the network of interest is small, then the DGT may be altered to a different type. Obtaining information about a group of devices takes more time than getting information from a single device. However, receiving information about a single device congests the network because it requires more queries in obtaining the information. Therefore, it is desirable to be able to dynamically alter the DGT to perform discovery of the network in a most optimal manner.

In a preferred embodiment, metrics are stored to determine an efficient process for discovering or monitoring a network. Examples of metrics which may be stored are, for example, results of a previous monitoring, information about types of devices connected to the network after discovery of the network, and topology of the network. Results of previous monitoring may include, for example, number of times a device connected to the network was found dead or alive, time taken to perform a SNMP or "ping" query of a device, number of devices a SNMP query supplied information about, number of queries made to a specific device, and likelihood of discovering another device. Information about types of devices connected to the network may include, for example, whether the device is SNMP capable, whether the device is "ping" capable, whether the device is SNMP capable and is a router device, and whether the device is SNMP capable and is a firewall device. The topology of the network may include, for example, a determination whether devices that are heavily burdened by data gathering require limiting the number of queries on a device and which resources within the network utilize these resources at a single time.

With reference now to FIG. 1, a diagram depicting a known logical configuration of software and hardware resources is provided. In this example, the software is organized in an object-oriented system. Application object 102, device driver object 104, and operating system object 106 communicate across network 108 with other objects and with hardware resources 110-114. An object is an application programming interface which may be performed using an endpoint.

In general, objects 102-106 require some type of processing, input/output, or storage capability from hardware resources 110-114. Objects 102-106 may execute on the same device to which the hardware resource is connected, or objects 102-106 may be physically dispersed throughout a distributed computing environment. Objects 102-106 request access to the hardware resource in a variety of manners, e.g., operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
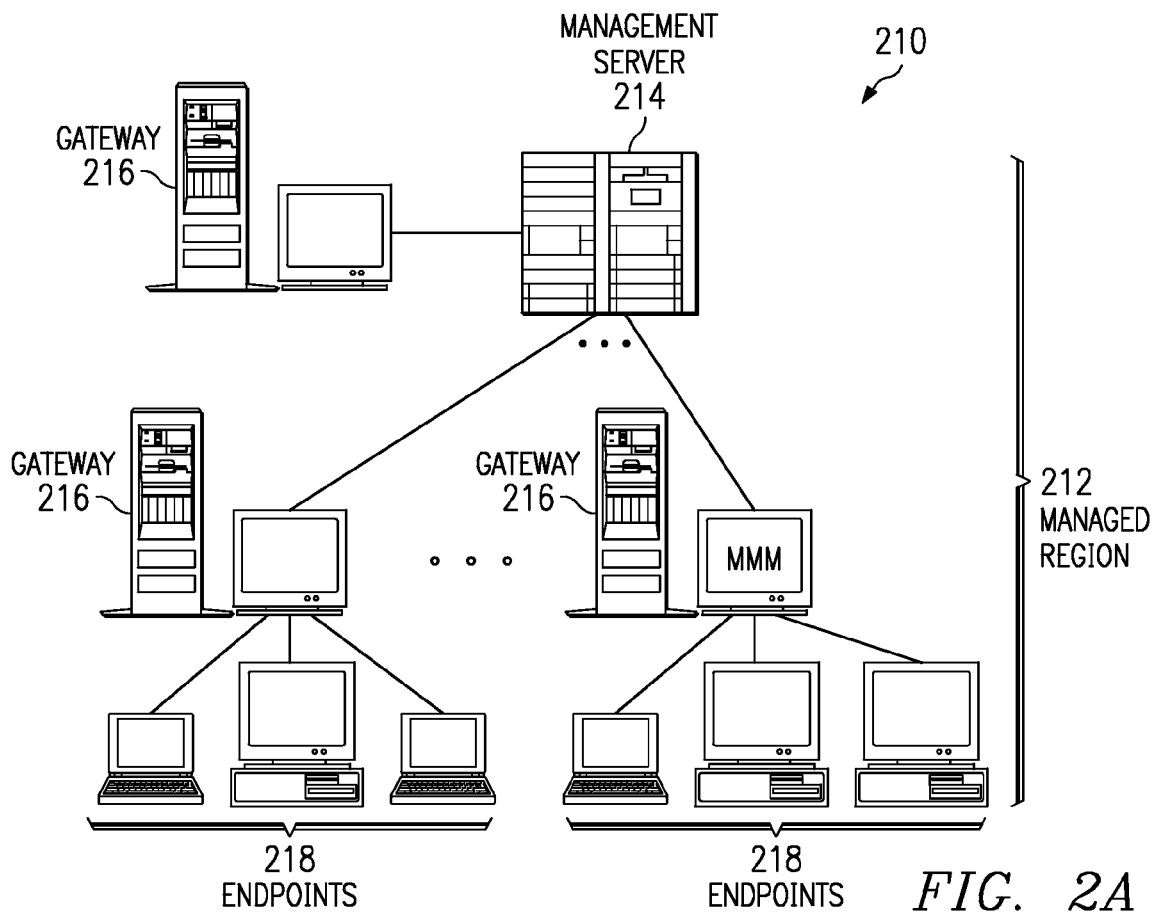
FIG. 2A is simplified diagram illustrating a large distributed computing enterprise environment in accordance with the present invention.

FIG. 2A is simplified diagram illustrating a large distributed computing enterprise environment in accordance with the present invention. In this example, the present invention is preferably implemented in a large distributed computer environment 210 comprising, for example, thousands of "nodes". The nodes will typically be geographically dispersed and an overall environment is "managed" in a distributed manner. Preferably, the managed environment is logically broken down into a series of loosely connected managed regions (MRs) 212, each with its own management server 214 for managing local resources within managed region 212. A network, such as network 108 in FIG. 1, typically will include other servers (not shown) for carrying out other distributed network functions. These servers include name servers, security servers, file servers, thread servers, time servers and the like. Management servers 214 coordinate activities across an enterprise and permit remote management and operation. Each management server 214 serves a number of gateway machines 216, each of which in turn support a plurality of endpoints/terminal nodes 218. Management server 214 coordinates all activity within the managed region using a terminal node manager at management server 214.

Figure 2B:
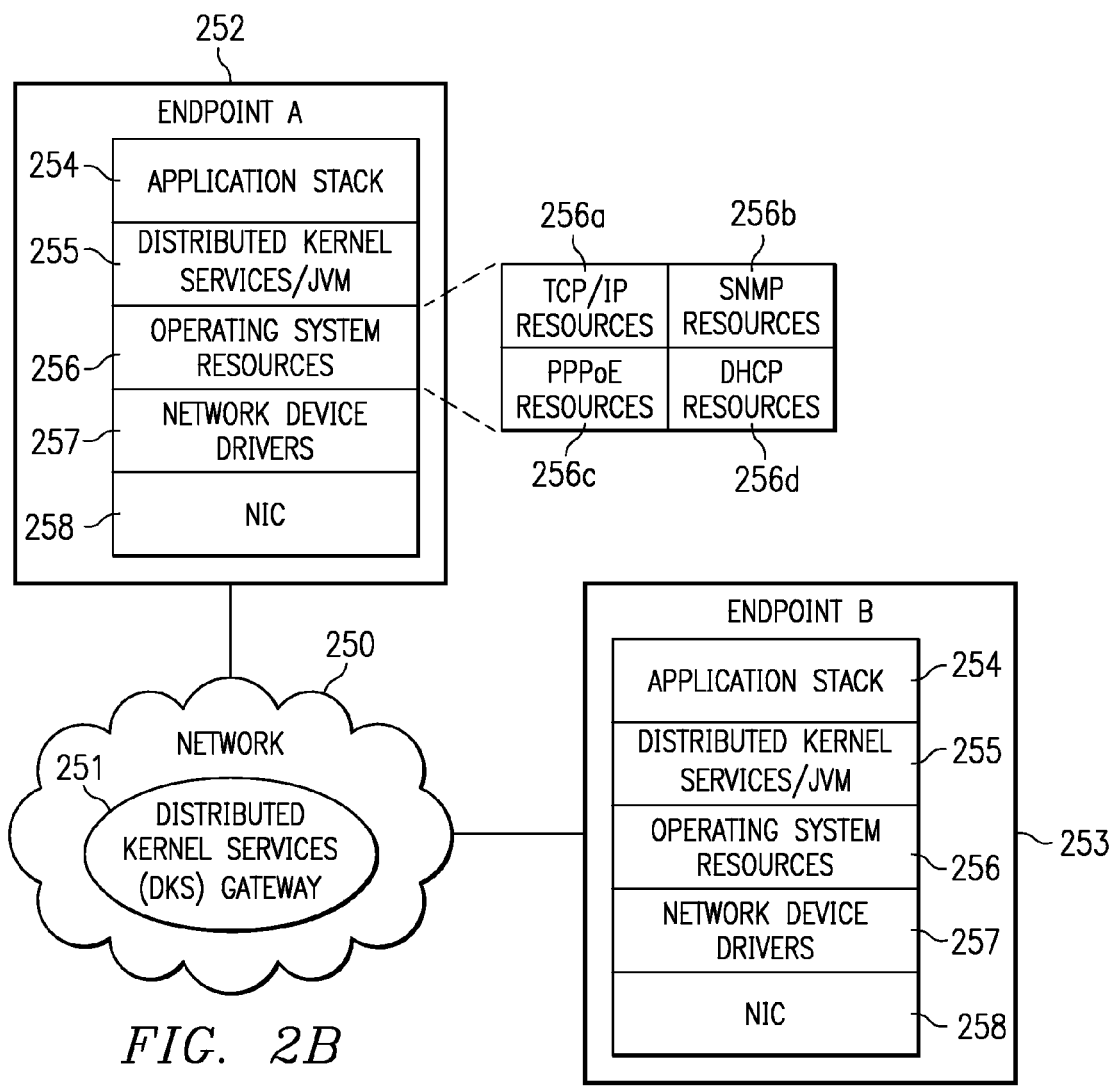
FIG. 2B is a diagram depicting logical relationships between components within a system management framework that includes two endpoints and a gateway in accordance with the present invention.

FIG. 2B is a diagram depicting logical relationships between components within a system management framework that includes two endpoints and a gateway in accordance with the present invention. FIG. 2B shows more detail of a relationship between components at an endpoint. In this example, network 250 includes gateway 251 and endpoints 252 and 253, which contain similar components, as indicated by the similar reference numerals used in FIG. 2B. An endpoint may support a set of applications 254 that use services provided by distributed kernel services 255, which may rely upon a set of platform-specific operating system resources 256. Operating system resources may include TCP/IP-type resources 256a, SNMP-type resources 256b, PPPoE-type resources 256c and DHCP-type resources 256d. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 3:
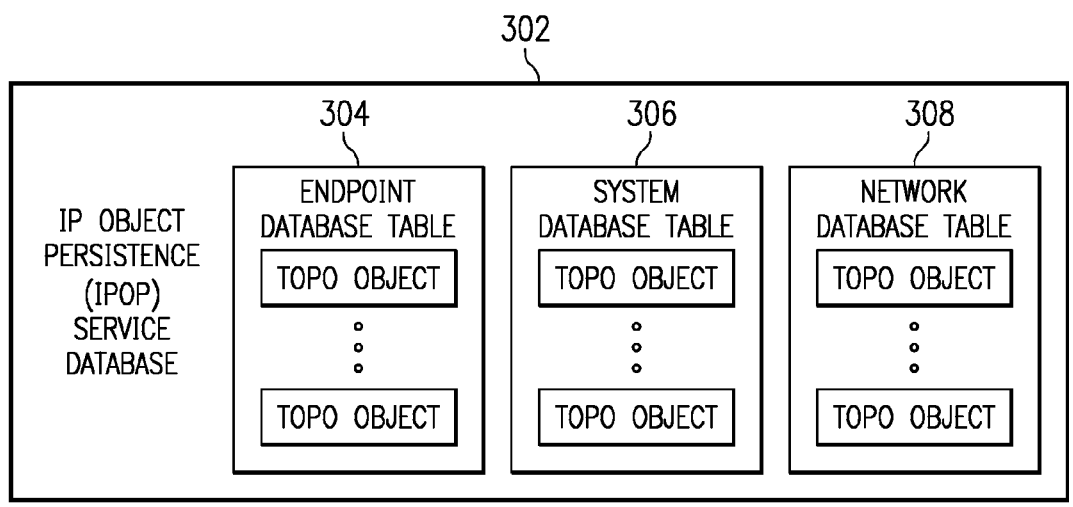
FIG. 3 is a block diagram illustrating data stored by an IPOP (IP Object Persistence) service in accordance with the present invention.

FIG. 3 is a block diagram illustrating data stored by an IPOP (IP Object Persistence) service in accordance with the present invention. FIG. 3 shows that topological (topo) objects may be separated into a variety of categories that facilitate processing on various objects. Separation of physical network categories facilitates efficient querying and storage of these objects while maintaining physical network relationships between the objects in order to produce a graphical user interface of a network topology. In this example, IPOP service database 302 contains endpoint database table 304, system database table 306, and network database table 308. Each table contains a set of top( ) objects for facilitating leasing of resources at IP endpoints and execution of action objects. Information within IPOP service database 302 allows applications to generate action objects for resources previously identified as IP objects through a discovery process across the distributed computing environment.

Figure 4:
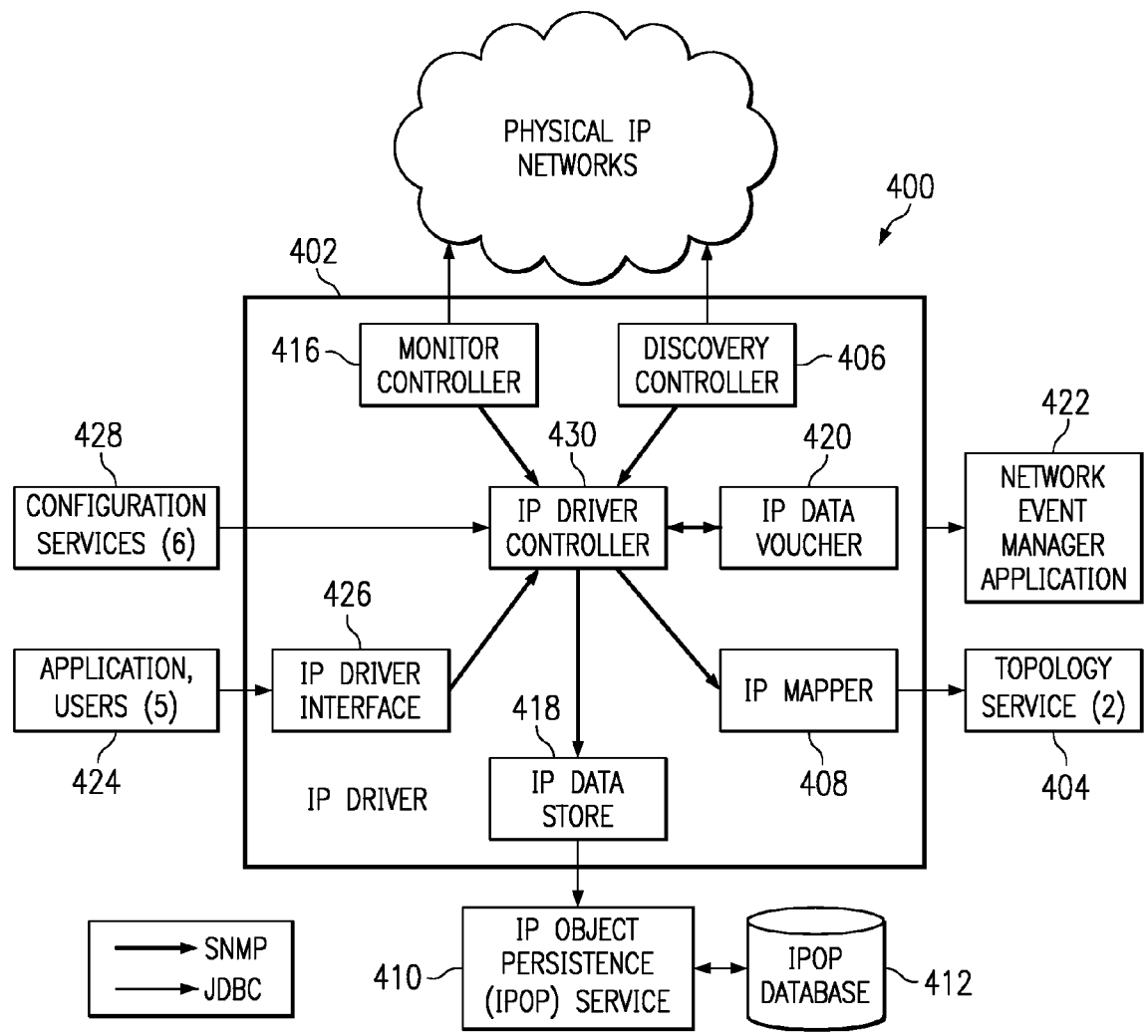
FIG. 4 is a block diagram illustrating an IPOP service in more detail in accordance with the present invention.

FIG. 4 is a block diagram illustrating an IPOP service in more detail in accordance with the present invention. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for manipulation of other applications. An IP driver system can also monitor objects for changes in IP topology and update databases with new topology information. The IPOP service provides services for other applications to access IP Service database 302 in FIG. 3.

In this example, IP driver subsystem 400 contains a conglomeration of components, including one or more IP drivers 402. Every IP driver manages its own "scope", which is described in more detail further below, and every IP driver is assigned to a topology manager within Topology Service 404, which can serve as more than one IP driver. Topology Service 404 stores topology information obtained from discovery controller 406. The information stored within Topology Service 404 may include graphs, arcs, and relationships between nodes determined by IP mapper 408. Users can be provided with a GUI to navigate the topology, which can be stored within a database within Topology Service 404.

IPOP service 410 provides a persistent repository 412 for discovered IP objects. Persistent repository 412 contains attributes of IP objects without presentation information. Discovery controller 406 detects IP objects in Physical IP networks 414, and monitor controller 416 monitors IP objects. A persistent repository, such as IPOP database 412, is updated to contain information about discovered and monitored IP objects. IP driver may use temporary IP data store component 418 and IP data cache component 420 as necessary for caching IP objects or storing IP objects in persistent repository 412, respectively. As discovery controller 406 and monitor controller 416 perform detection and monitoring functions, events can be written to network event manager application 422 to alert network administrators of certain occurrences within the network, such as the discovery of duplicate IP addresses or invalid network masks.

External applications/users 424 can be other users, such as network administrators at management consoles, or applications that use IP driver GUI interface 426 to configure IP driver 402, manage/unmanage IP objects, and manipulate objects in persistent repository 412. Configuration service 428 provides configuration information to IP driver 402. IP driver controller 432 serves as central control of all other IP driver components.

IPOP Service 410 in FIG. 4 manages discovered IP objects, and to do so, IPOP Service 410 uses a distributed database in order to efficiently service query requests by a gateway to determine routing, identity, or a variety of details about an endpoint. IPOP Service 410 also services queries by Topology Service 404 in order to display a physical network or map a physical network to a logical network, which is a subset of a physical network that is defined programmatically or by an administrator. IPOP fault tolerance is also achieved by distribution of IPOP data and IPOP Service 410 among many endpoint ORBs.

One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope, which is explained in more detail below, is a set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e. if two drivers attempt to discover/monitor the same device. Accurately defining unique and independent scopes may require development of a scope configuration tool to verify uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across an installation, like 10.0.0.0 network. In order to manage private networks properly, first, the IP driver has to be installed inside internal networks in order to be able to discover and manage the networks. Second, since discovered IP addresses may not be unique across an entire installation that consists of multiple regions, multiple customers, etc., a private network ID has to be assigned to the private network addresses. In the preferred embodiment, a unique name of a subnet becomes "privateNetworkId\subnetAddress". Those customers that do not have duplicate network addresses can just ignore the private network ID and a default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only translated IP addresses and discover only the IP addresses translated. If not all IP addresses inside the NAT are translated, an IP driver will not be able to discover all of them. However, if IP drivers are installed this way, users do not have to configure the private network ID.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about other IP drivers because there is no synchronization of information between IP drivers. A Configuration Service provides the services to allow DKS components to store and retrieve configuration information for a variety of other services from anywhere in the networks. In particular, scope configuration will be stored in the Configuration Services so that IP drivers and other applications can access the information.

Ranges of addresses that a driver will discover and monitor are determined by associating a subnet address with a subnet mask and associating a resulting range of addresses with a subnet priority. An IP driver is a collection of such ranges of addresses, and the subnet priority is used to help decide the system address. A system can belong to two or more subnets, such as is commonly seen with a gateway. The system address is the address of one of the NICs that is used to make SNMP queries. A user interface can be provided, such as an administrator console, to write scope information into the Configuration Service. System administrators do not need to provide this information at all, however, as the IP drivers can use default values.

An IP driver gets its scope configuration information from the Configuration Service, which may be stored using the following format:

scopeID=driverID,anchorname,subnetAddress:subnetMask
[:privateNetworkId:privateNetworkName:subnetPriority][,
subnetAddress:subnetMask:privateNetworkId:privateNetworkName :subnetPriority]]

Typically, one IP driver manages only one scope. Hence, the "scopeID" and "driverID" would be the same. However, the configuration can provide for more than one scope managed by the same driver. "Anchorname" is the name in the name space in which Topology Service 404 will put IP networks objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the Configuration Service would be: 2=2,ip,147.0.0.0: 255.254.0.0,146.100.0.0:255.255.0.0, 69.0.0.0:255.0.0.0.

| Subnet address | Subnet mask |
|---|---|
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and a "scoping" process is a straightforward association of a driver's ID with the system's IP address.

Routers and multi-homed systems, however, complicate discovery and monitoring processes because these devices may contain interfaces that are associated with different subnets. If all subnets of routers and multi-homed systems are in the scope of the same driver, the IP driver will manage the whole system. However, if the subnets of routers and multi-homed systems are across scopes of different drivers, a convention is needed to determine a dominant interface: the IP driver that manages the dominant interface will manage a router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determine the dominant interface before using the lowest IP address. If the subnet priorities are the same, the lowest IP address is then used. Since the default subnet priority would be "0", then the lowest IP address would be used by default.

Figure 5:
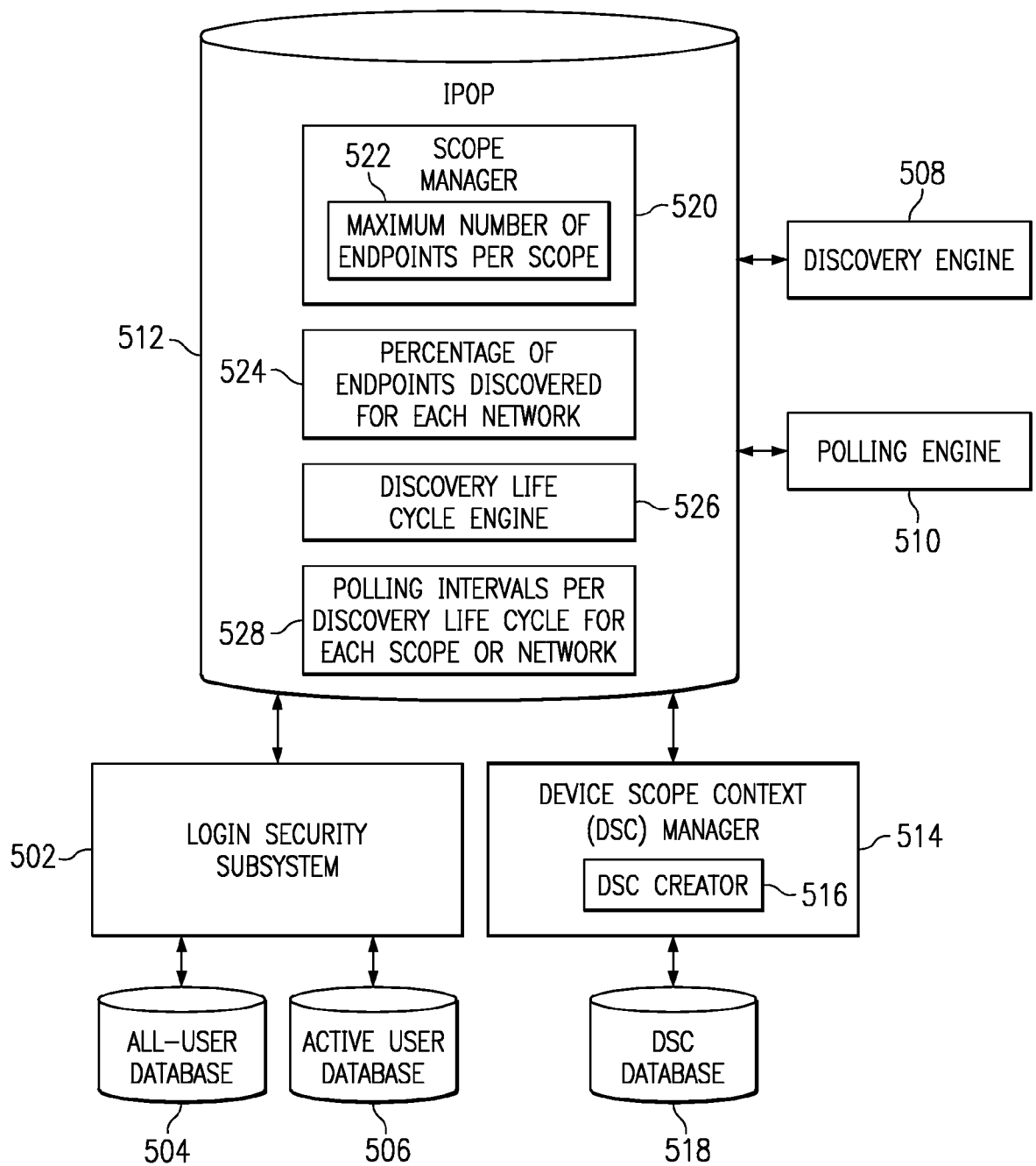
FIG. 5 is a block diagram illustrating a set of components that may be used to implement adaptive discovery and adaptive polling in accordance with the present invention.

FIG. 5 is a block diagram illustrating a set of components that may be used to implement adaptive discovery and adaptive polling in accordance with the present invention. In this example, login security subsystem 502 provides a typical authentication service, which may be used to verify identity of users during a login process. All-user database 504 provides information about all users in the DKS system, and active user database 506 contains information about users that are currently logged into the DKS system.

Discovery engine 508, similar to discovery controller 406 in FIG. 4, detects IP objects within an IP network. Polling engine 510, similar to monitor controller 416 in FIG. 4, monitors IP objects. A persistent repository, such as IPOP database 512, is updated to contain information about discovered and monitored IP objects. IPOP 512 also obtains a list of all users from the security subsystem which queries all-users database 504 when initially creating a DSC. During subsequent operations to map a location of a user to an ORB, device scope context (DSC) manager 514 will query the active user database 506.

DSC manager 514 queries IPOP 512 for all endpoint data during the initial creation of DSCs and any additional information needed, such as decoding an ORB address to an endpoint in IPOP 512 and back to a DSC using an IPOPOid. The IPOPid is the ID of a network object as opposed to an address.

As explained in more detail further below with respect to FIG. 7, an administrator will fill out security information with respect to access user or endpoint access and designate which users and endpoints will have a DSC. If not configured by the administrator, the default DSC will be used. While not all endpoints will have an associated DSC, IPOP endpoint data 512, login security subsystem 502, and security information 504 are needed in order to create the initial DSCs.

DSC manager 514, acting as a DSC data consumer, explained in more detail further below, then listens to this data waiting for new endpoints or users or changes to existing ones. DSC configuration changes are advertised by a responsible network management application. Some configuration changes will trigger creation of more DSCs, while others will cause DSC data in DSC database 518 to be updated.

All DSCs are stored in DSC database 518 by DSC creator 516, which also fetches DSCs upon configuration changes in order to determine whether or not a DSC already exists. DSC manager 514 primarily fetches DSCs from DSC database 518, but also adds runtime information, such as ORB ID, which is ultimately used to determine a manner in which polling engine 510 should adapt to a particular user or endpoint.

IPOP 512 also incorporates scope manager 520, which stores information about scopes, such as the maximum number of endpoints within each scope 522. Scope manager 520 computes relationships between endpoints and scopes, as necessary. IPOP 512 also stores the number of endpoints that have been discovered for each network or scope 524, which is used by discovery life cycle engine 526.

Figure 6:
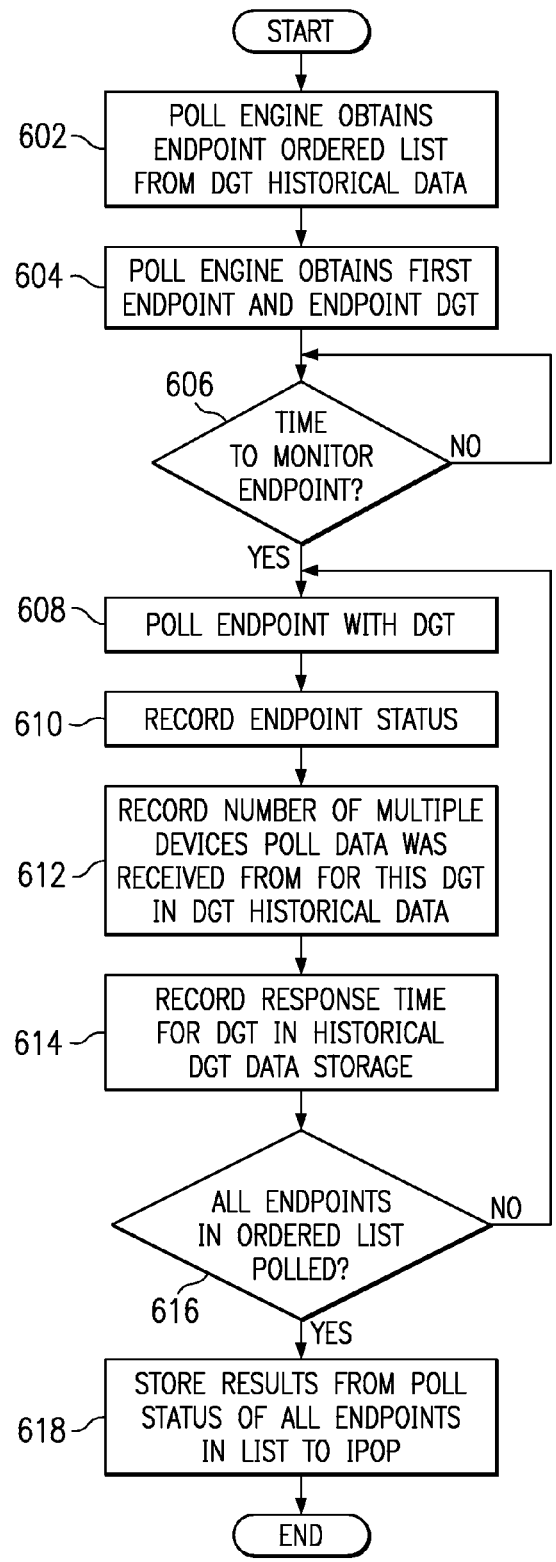
FIG. 6 is a flowchart to poll endpoint status using a DGT and to store DGT results in accordance with a preferred embodiment of the present invention.

FIG. 6 is a flowchart to poll endpoint status using a DGT and to store DGT results in accordance with a preferred embodiment of the present invention. In this example, the operation starts by a poll engine obtaining an endpoint ordered list from DGT historical data (step 602). The poll engine obtains a first endpoint and endpoint DGT (step 604). A determination is then made as to whether or not a time has arrived to monitor the endpoint (step 606). If a time has not arrived to monitor the endpoint (step 606:NO), the operation returns to step 606 in which the determination is made as to whether or not a time has arrived to monitor the endpoint. If a time has arrived to monitor the endpoint (step 606:YES), the endpoint is polled with the DGT (step 608). Status of the polled endpoint is recorded (step 610).

The number of multiple devices from which poll data was received from for this DGT in the historical data is recorded (step 612). A response time for polling of the endpoint for the DGT is recorded in the historical DGT data storage (step 614). A determination is then made as to whether or not all endpoints in the ordered list have been polled (step 618). If all endpoints in the ordered list have not been polled (step 618: NO), the operation returns to step 608 in which an endpoint is polled with the DGT. If all endpoints in the ordered list have been polled (step 618:YES), results are stored in the IPOP from a poll status of all endpoints in the ordered list (step 620), and thereafter the operation terminates.

The present invention is applicable to variety of uses, and the previous figures described a general manner in which a device scope context can be associated with a source user or a source endpoint. The following figures describe a particular use of the present invention in which discovery and monitoring information may be obtained from a device or devices connected to a network. Retrieval of the network discovery and monitoring information may be configured by a user or administrator or may be programmatically determined in order to provide the most appropriate method of discovery and monitoring of the network to use at runtime.

Figure 7:
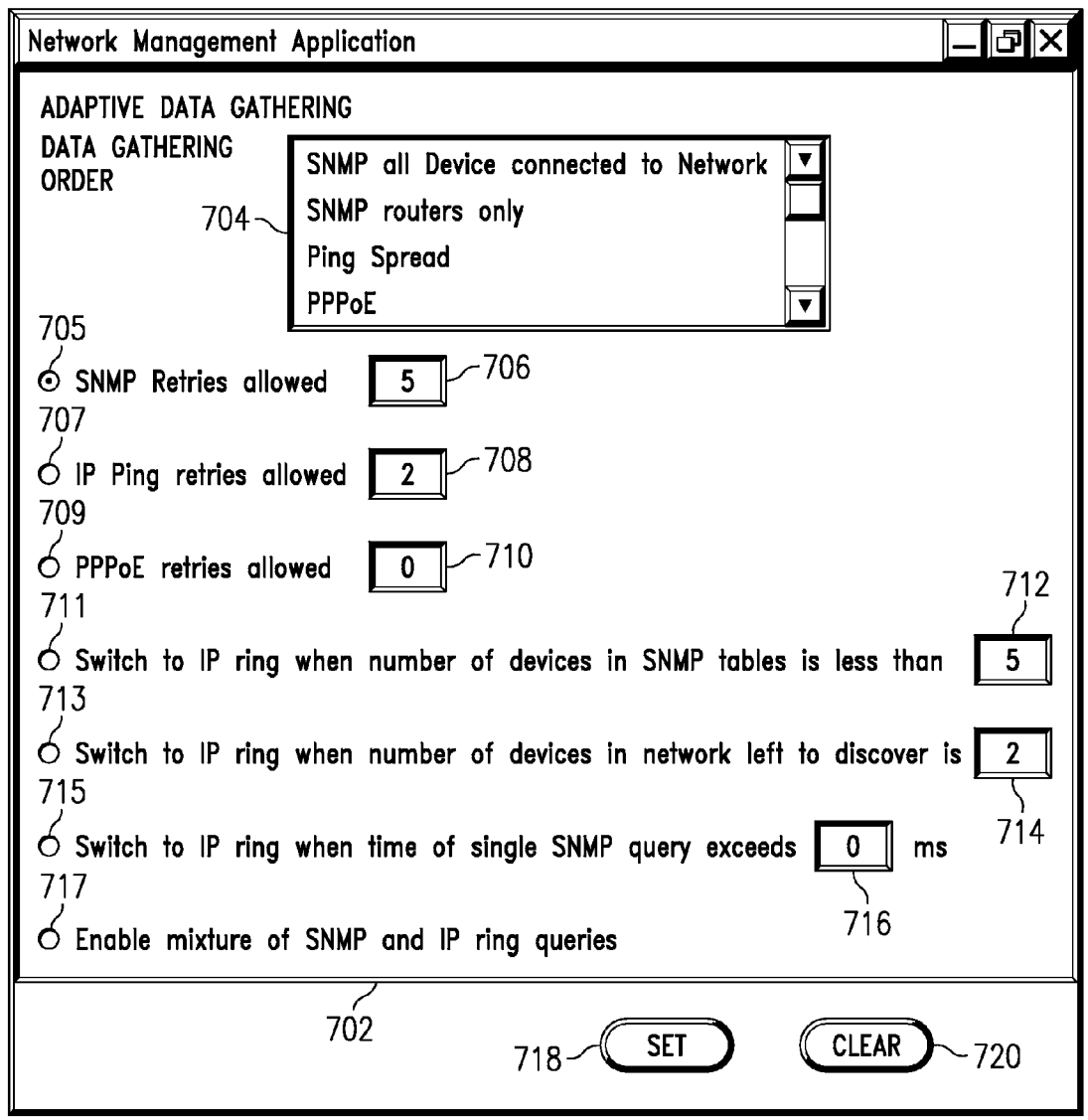
FIG. 7 depicts a graphical user interface that may be used to set monitoring parameters for adaptive discovery and monitoring of devices associated with a network in accordance with the present invention.

FIG. 7 depicts a graphical user interface that may be used to set monitoring parameters for adaptive discovery and monitoring of devices associated with a network in accordance with the present invention. Graphical user interface 700 shows a dialog box that is associated with a network management application. Input area 702 allows a system or network administrator to set adaptive data gathering parameters, the data gathering order and to specify types of data gathering protocols to be used on the network in order to manage the network. Pull down menu 704 allows a user or system administrator to choose an order of data gathering methods to be used. The user or system administrator may choose one or more of the data gathering methods in pull down menu 704. Radio button 705 allows a user or system administrator to specify, in input field 706, the number of SNMP retries that are to be allowed after a failed attempt to monitor a device using a SNMP. Radio button 707 allows a user or system administrator to specify, in input field 708, the number of IP ping retries that are to be allowed after a failed attempt to monitor a device using an IP ping. Radio button 709 allows a user or system administrator to specify, in input field 710, the number of PPPoE retries that are to be allowed after a failed attempt to monitor a device using a PPPoE.

Radio button 711 allows for a user or system administrator to specify, in input field 712, to switch to an IP ping when a number of devices in a SNMP table is less than a specified number. Radio button 713 allows for a user or system administrator to specify, in input field 714, to switch to an IP ping when a number of devices in the network equals a specified number. Radio button 715 allow for a user or system administrator to specify, in input field 716, to switch to an IP ping when time of a single SNMP query reaches a certain time interval, and this value in input field 716 may be expressed in milliseconds in this example. Radio button 717 allows for a user or system administrator to specify that a mixture of SNMP and IP ping queries are to be used in the adaptive gathering method as shown in graphical user interface 700. Buttons 718 and 720 allow the user or system administrator to set inputted values as necessary.

Figure 8:
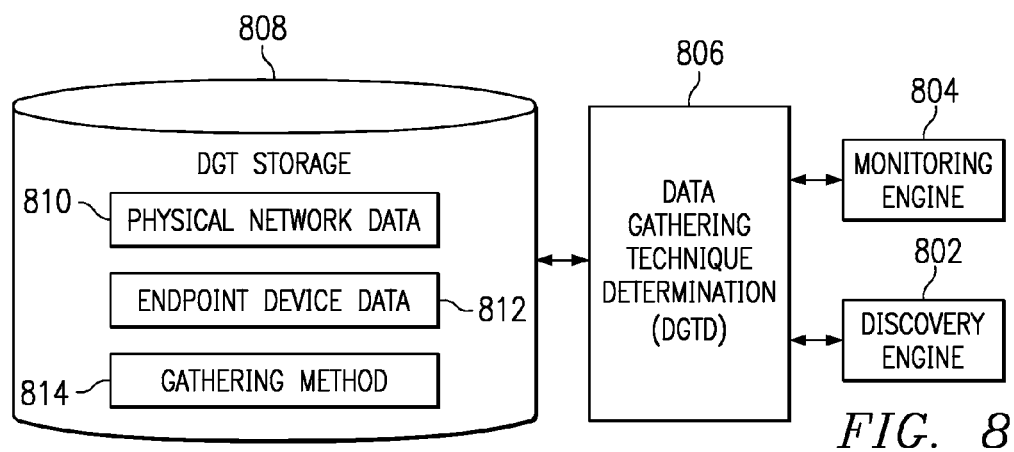
FIG. 8 is a block diagram illustrating a set of components that may be used to implement adaptive discovery and monitoring of a network in accordance with the present invention.

FIG. 8 is a block diagram illustrating a set of components that may be used to implement adaptive discovery and monitoring of a network in accordance with the present invention. In this example, DGT storage 808 contains information regarding physical network data 810, endpoint device data 812 and gathering method 814. A persistent repository, such as Data Gathering History database (DGHD) 808, is updated to contain information about discovered and monitored devices. Data Gathering Technique Determination (DGTD) 806 queries discovery engine 802 for all information gained during a discovery operation of the network. In addition, DGTD 806 queries monitoring engine 804 for all information gained during a monitoring operation of the network. This discovery information from discovery engine 802 and monitoring engine 804 is stored in DGT storage 808.

Physical network data 810 may contain information about NIC speed, latency to router, SNMP latency to router, fastest device NIC ordered list of device, largest numbers of devices that have been yielded in an ordered list, shortest latency ordered list of devices, data gathering order, device gathering order and the like. Endpoint device data 812 may contain information about a point in which a device was sensed to be alive, number of retries allowed, whether a device is SNMP capable, whether a device is IP ping capable, whether a device is PPPOE capable, and ordered list of SNMP devices used most often, number of devices which gave information during the last monitoring or discovery period, number of new devices which gave information during a monitoring or discovery period, and the like. Gathering method 814 may contain information about a number of retires specified or a data gathering order as specified by DGTD 806.

Figure 9A:
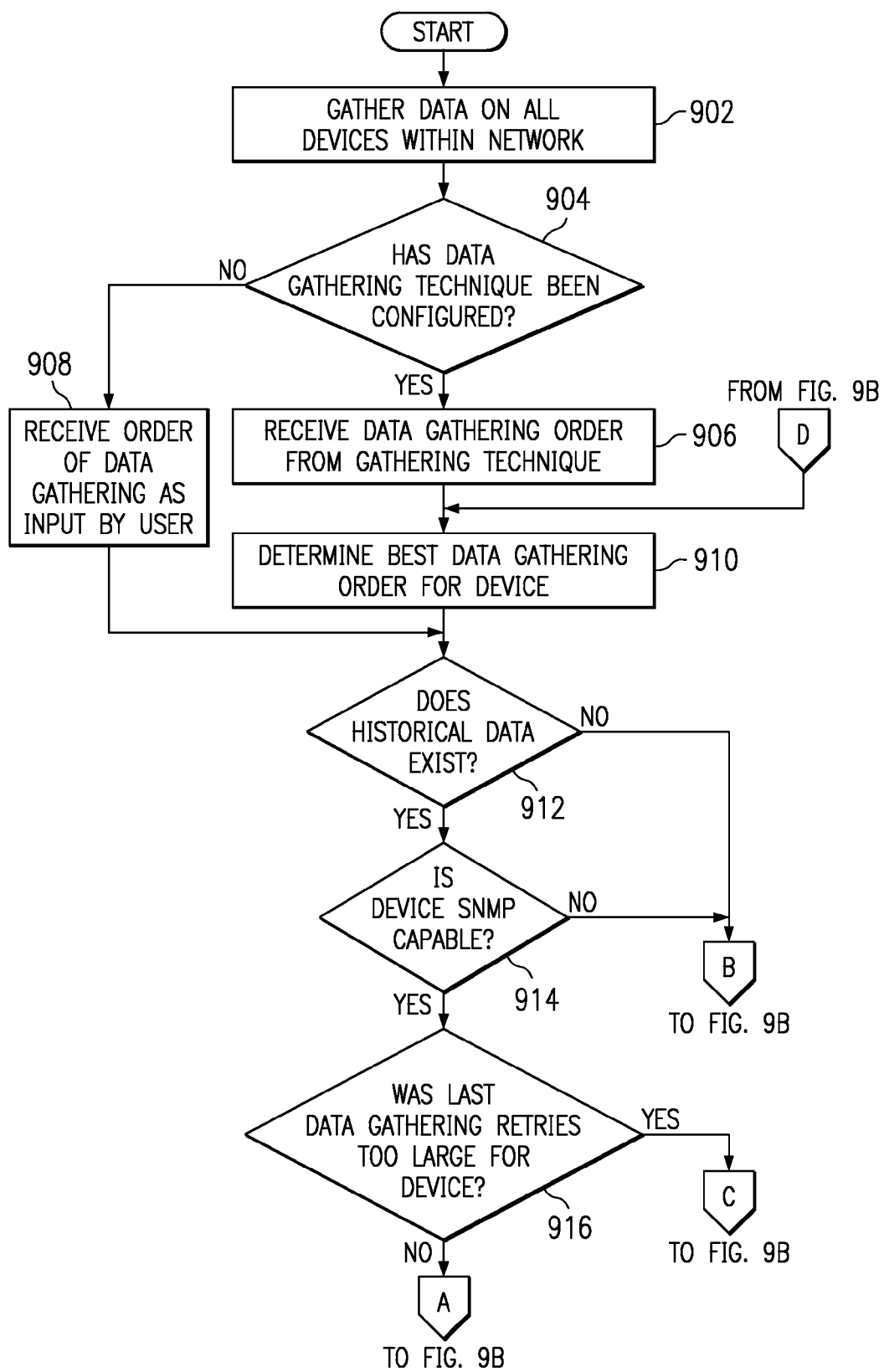
FIGS. 9A-9B are flowcharts illustrating an operation of reading a defined configuration of data gathering techniques of a device in accordance with the present invention.
Figure 9B:
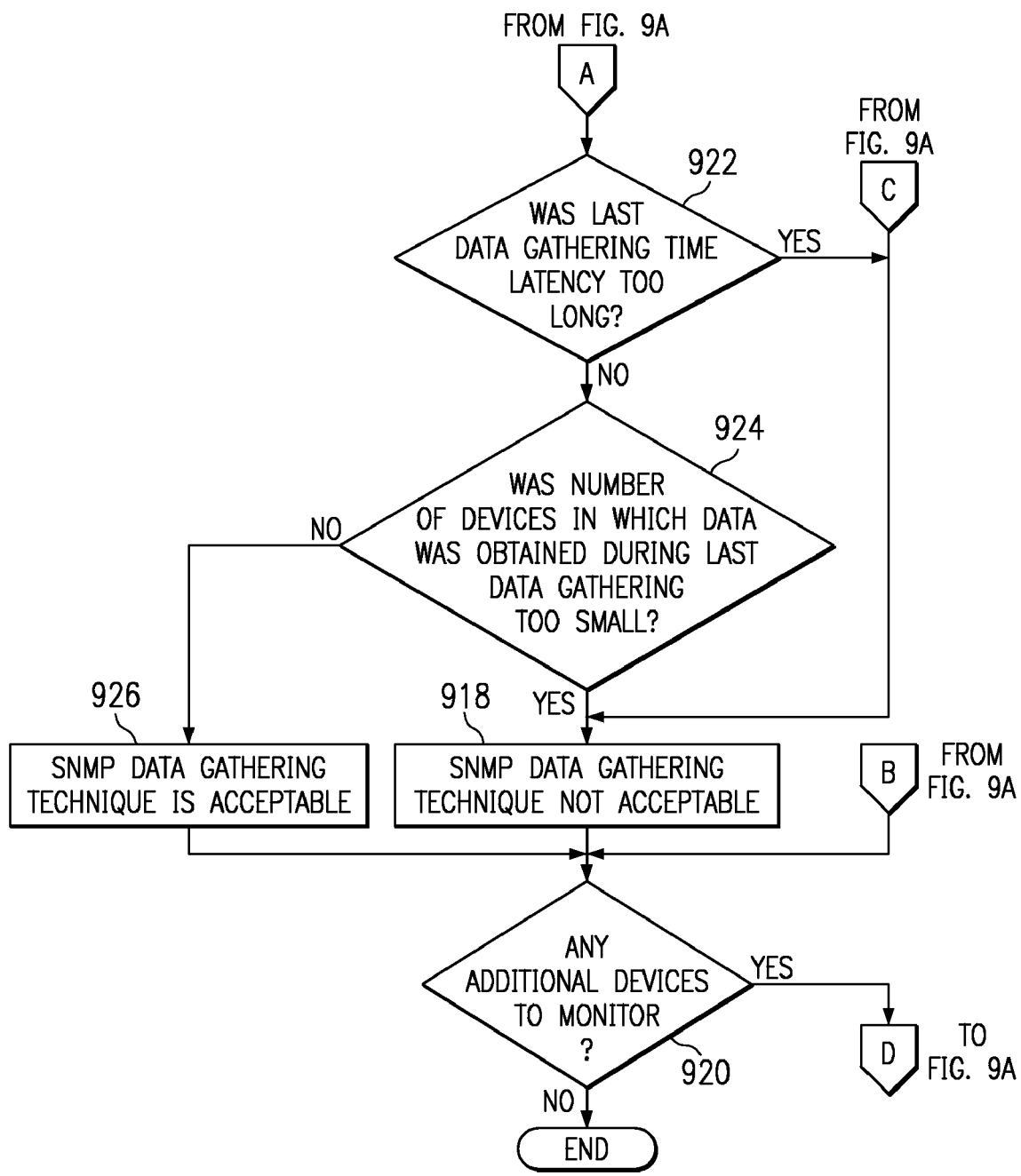

FIGS. 9A-9B are flowcharts illustrating an operation of reading a defined configuration of data gathering techniques of a device in accordance with the present invention. In this example, the operation starts by gathering data on all devices with a network (step 902). A determination is then made as to whether or not a data gathering technique has been configured (step 904). A data gathering technique may be defined by using, for example graphical user interface 700 in FIG. 7. If a data gathering technique has not been configured (step 904: NO), an order of data gathering is received as input by a user (step 908), and the operation continues to step 912 in which a determination is made as to whether or not historical data exists.

If a data gathering technique has been configured (step 904:YES), data gathering order is received from the gathering data technique (step 906). A best data ordering is determined for the device (step 910). A determination is then made as to whether or not historical data for this device exists (step 912). If historical data for this device does not exist (step 912:NO), then a determination is made as to whether or not any additional devices are available to be monitored (step 920). If no additional devices are available to be monitored (step 920: NO), the operation terminates. If additional devices are available to be monitored (step 920:YES), the operation returns to step 910 in which a best data gathering order for the device is determined.

Returning to step 912, if historical data does exist for this device (step 912:YES), then a determination is made as to whether or not the device is SNMP capable (step 914). If the device does not have a SNMP agent then SNMP cannot be used to discover the device. If the device is not SNMP capable (step 914:NO), the operation continues to step 920 in which the determination is made as to whether or not there are any additional devices available to monitor. If the device is SNMP capable (step 914:YES), a determination is made as to whether or not a last data gathering retry has been reached (step 916). If the last data gathering retry was too large for the device (step 916:YES), the SNMP data gathering technique is not acceptable (step 918) and the operation then continues to step 920 in which the determination is made as to whether or not there are any additional devices available to monitor.

If the last data gathering retry was not too large for the device (step 916:NO), a determination is then made as to whether or not a last data gathering time latency was too long for the device (step 922). If a timeout value has been reached then a time latency has been reached. If the last data gathering time latency was too long for the device (step 922:YES), the operation continues to step 918 in which the SNMP data gathering technique is not acceptable for this device.

If the last data gathering time latency was not too long for the device (step 922:NO), a determination is made as to whether or not a number of devices in which data was obtained during a last data gathering was too small (step 924). If the number of devices in which data was obtained during a last data gathering was too small (step 924:YES), the operation continues to step 918 in which the SNMP data gathering technique is not acceptable. If the number of devices in which data was obtained during the last data gathering was not too small (step 924:NO), the SNMP data gathering technique is acceptable (step 926). The operation then returns to step 920 in which a determination is made as to whether or not there are any additional devices to monitor.

Figure 9C:
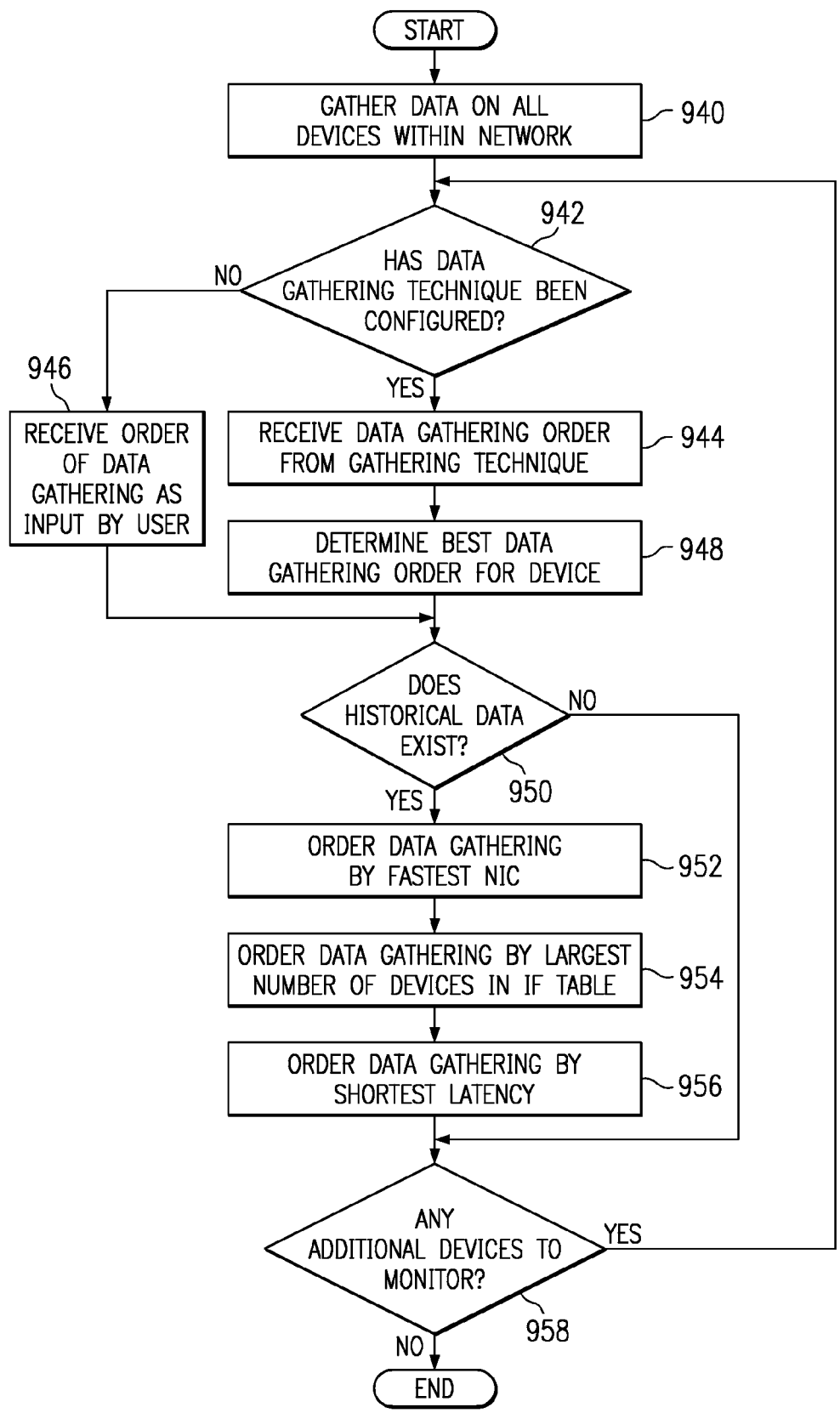
FIG. 9C is a flowchart illustrating an operation of reading a defined configuration of data gathering techniques of a network in accordance with the present invention.

FIG. 9C is a flowchart illustrating an operation of reading a defined configuration of data gathering techniques of a network in accordance with the present invention. In this example, the operation starts by gathering data on all devices with a network (step 940). A determination is then made as to whether or not a data gathering technique has been configured (step 942). A data gathering technique may be defined by using, for example graphical user interface 700 in FIG. 7. If a data gathering technique has not been configured (step 942: NO), an order of data gathering is received as input by a user (step 946), and the operation continues to step 950 in which a determination is made as to whether or not historical data exists.

If a data gathering technique has been configured (step 942:YES), data gathering is received from the gathering data technique (step 944). A best data ordering is determined for the device (step 948). A determination is then made as to whether or not historical data for this device exists (step 950). If historical data for this device does not exist (step 950:NO), then a determination is made as to whether or not any additional devices are available to be monitored (step 958). If no additional devices are available to be monitored (step 958: NO), the operation terminates. If additional devices are available to be monitored (step 958:YES), the operation returns to step 942 in which the determination is made as to whether or not a data gathering technique has been configured for the device.

Returning to step 950, if historical data does exist for this device (step 950:YES), then data gathering is ordered by a fastest NIC (step 952). As stated above, a NIC is a network interface card. Data gathering is ordered by the largest number of devices in an interface (IF) table (step 954). Data gathering it then ordered by a shortest latency time in which may be the time in which the device took to respond. A determination is then made as to whether or not there are any additional devices to monitor (step 958). If there are not additional devices to monitor (step 958:NO), the operation terminates. If there are additional devices to monitor (step 958:YES), the operation returns to step 940 in which data is gathered on all devices within the network.

Figure 9D:
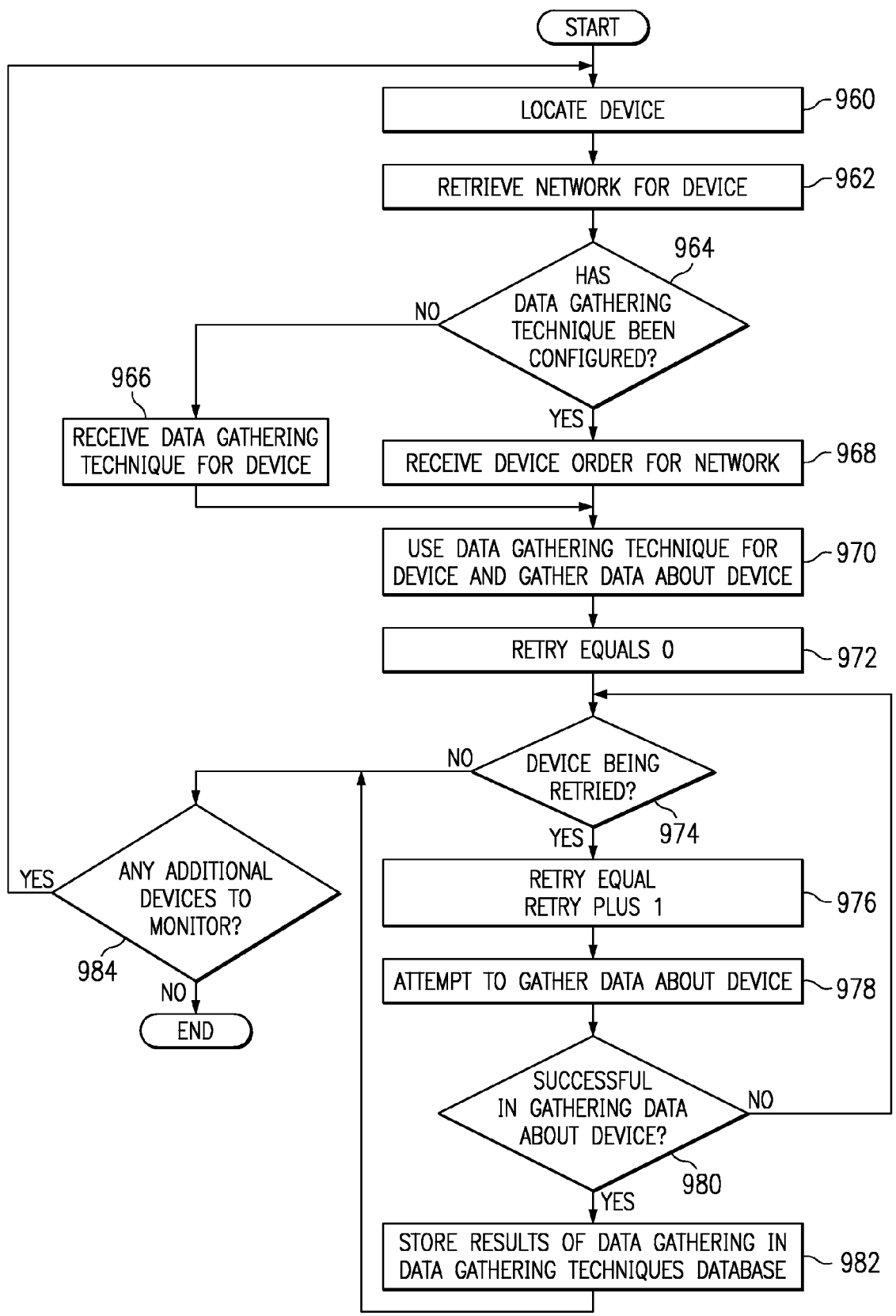
FIG. 9D is a flowchart illustrating an operation of reading a defined configuration of data monitoring techniques for a device in accordance with the present invention.

FIG. 9D is a flowchart illustrating an operation of reading a defined configuration of data monitoring techniques for a device in accordance with the present invention. In this example, the operation starts by locating a device (step 960). A network for the device is then retrieved (step 962). A network object is in code representing the physical network. A determination is then made as to whether or not a data gathering technique has been configured for the device (step 964). If a data gathering technique has not been configured for the device (step 964:NO), a data gathering technique is received (step 966). The operation then continues to step 970 in which the data gathering technique for a device is used to gather data about the device. This may data about status monitoring data about whether the device is alive or dead or whether the device exists or not.

If a data gathering technique has been configured for the device (step 964:YES), a device order is received for the network (step 966). The data gathering technique for the device is then used to gather data about the device (step 970). At this point, a retry value equals zero (step 972). A determination is made as to whether or nor the device is being retried for monitoring (step 974). If the device is not being retried for monitoring (step 974:NO), a determination is made as to whether or not any additional devices are available for monitoring (step 984). If there are not any additional devices available for monitoring (step 984:NO), the operation terminates. If there are additional devices available for monitoring (step 984:YES), the operation returns to step 960 in which a device is located.

Returning to step 974, if the device is being retried for monitoring (step 974:YES), the retry value equals the retry value in step 972 plus one (step 976). An attempt is made to gather data about the device (step 978). A determination is then made as to whether or not there was a successful attempt in gathering data about the device (step 980). If there was not a successful attempt in gathering data about the device (step 980:NO), the operation returns to step 974 in which a determination is made as to whether or not the device is being retried for monitoring. If there was a successful attempt to gather data about the device (step 980:YES), results of the gathered data is stored in a data gathering techniques database (step 982) and the operation returns to step 984 in which a determination is made as to whether or not there are any additional devices to monitor.

In a highly distributed system, monitoring operations are performed by multiple components throughout the system. As described with respect to FIG. 4, an IP driver is responsible for monitoring one or more scopes, and multiple IP drivers are distributed throughout the overall distributed system. For example, a service provider may have a set of multiple IP drivers that are responsible for monitoring the networks of one customer, and the service provider could have another set of IP drivers that are responsible for monitoring the networks of another customer.

The advantages of the present invention should be apparent in view of the detailed description of the invention that is provided above. In prior art systems, monitoring/scanning applications have global configuration parameters that apply to all endpoints within a network or set of networks, and these prior art solutions are stymied by routers, firewalls, etc., to prevent dynamic discovery of endpoints. Hence, the prior art systems cannot dynamically adapt discovery and monitoring methods in accordance with a specific device or network.

In contrast, the present invention applies data gathering techniques for the network and devices on the network in a dynamic manner which corresponds to the device being observed. Data gathering techniques, such as, for example, SNMP, IP ping, PPPOE, and the like may be chosen to gather this data without wasting valuable time and resources be sending signals to devices which are not equipped to receive a certain signal. In addition, a value may be specified for retrying to discover or monitor a device. This retry value may be specified for any data gathering technique included in a network management system. Furthermore, a switch may be made between data gathering techniques so that each device is properly tested.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for discovering status of a network topology, comprising data processing system implemented steps of:
   discovering, by the data processing system, a status for an existing network topology;
   determining, by the data processing system, a next discovery action based on an event; and
   determining, by the data processing system from a plurality of data gathering techniques, a selected data gathering technique that is to be used by the data processing system when performing the next discovery action, the selected data gathering technique determination being based on a network response time, wherein the network response time is further based on at least one of a previous status of the existing network topology and a discovery event.

2. The method as recited in claim 1, wherein the event is one of a data gathering event, a discovery event and a configuration event, and wherein the plurality of data gathering techniques are a plurality of different network protocols used to access different devices on a network.

3. The method as recited in claim 1, wherein determining the selected data gathering technique based on a network response time is determined by a count of devices within the network.

4. The method as recited in claim 1, wherein determining the selected data gathering technique based on a network response time is determined by relative abilities of devices in the network.

5. The method as recited in claim 1, further comprising:
   storing the status for the existing network topology; and
   developing an order of relative capabilities for a managed device as compared to other device or devices in the network.

6. The method as recited in claim 1, wherein discovering a status for an existing network topology further includes employing a single device status gathering technique if a count of devices left to discover is less than a predetermined amount.

7. The method as recited in claim 6, wherein the status gathering technique is an Internet protocol packet Internet Groper (IP ping).

8. The method as recited in claim 1, wherein discovering a status for an existing network topology further includes employing a multiple device status gathering technique if a count of devices left to discover is more than a predetermined amount.

9. The method as recited in claim 8, wherein the status gathering technique is a simple network management protocol (SNMP).

10. The method as recited in claim 1, wherein discovering a status for an existing network topology includes determining a best order to discover the status for the existing network topology.

11. A computer program product stored in a tangible computer-readable storage-type medium and operable by a data processing system for discovering status of a network topology, comprising:
   instructions for discovering a status for an existing network topology;
   instructions for determining a next discovery action based on an event; and
   instructions for determining, from a plurality of data gathering techniques, a selected data gathering technique that is to be used by the data processing system when performing the next discovery action, the selected data gathering technique determination being based on a network response time, wherein the network response time is further based on at least one of a previous status of the existing network topology and a discovery event.

12. The computer program product as recited in claim 11, wherein the event is one of a data gathering event, a discovery event and a configuration event, and wherein the plurality of data gathering techniques are a plurality of different network protocols used to access different devices on a network.

13. The computer program product as recited in claim 11, wherein determining the selected data gathering technique based on a network response time is determined by a count of devices within the network.

14. The computer program product as recited in claim 11, wherein determining the selected data gathering technique based on a network response time is determined by relative abilities of devices in the network.

15. The computer program product as recited in claim 11, further comprising:
   instructions for storing the status for the existing network topology; and
   instructions for developing an order of relative capabilities for a managed device as compared to other device or devices in the network.

16. The computer program product as recited in claim 11, wherein discovering a status for an existing network topology further includes employing a single device status gathering technique if a count of devices left to discover is less than a predetermined amount.

17. The computer program product as recited in claim 16, wherein the status gathering technique is an Internet protocol packet Internet Groper (IP ping).

18. The computer program product as recited in claim 11, wherein discovering a status for an existing network topology further includes employing a multiple device status gathering technique if a count of devices left to discover is more than a predetermined amount.

19. The computer program product as recited in claim 18, wherein the status gathering technique is a simple network management protocol (SNMP).

20. The computer program product as recited in claim 11, wherein discovering a status for an existing network topology includes determining a best order to discover the status for the existing network topology.

21. A data processing system for discovering status of, and then monitoring, a network topology, the data processing system including a data processor and a memory coupled to the data processing, the data processing system further comprising:
   discovering means for discovering a status for an existing network topology;
   determining means for determining a next discovery action based on an event; and
   determining means for determining, from a plurality of data gathering techniques, a selected data gathering technique that is to be used by the data processing system when monitoring particular ones of a plurality of network objects within the network topology, the selected data gathering technique determination being based on a network response time, wherein the network response time is further based on at least one of a previous status of the existing network topology and a discovery event; and
   monitoring means for monitoring the network objects using the network access policies that were determined to be used for the particular ones of the network objects.

* * * * *